United States Patent [19]

Reyes

[11] Patent Number: 5,355,837
[45] Date of Patent: Oct. 18, 1994

[54] CANINE TRAINER AND TOILET STATION

[76] Inventor: Richard B. Reyes, 1842 W. Bayshore, Apt. 4, East Palo Alto, Calif. 94303

[21] Appl. No.: 125,047

[22] Filed: Sep. 21, 1993

[51] Int. Cl.$^5$ .............................................. A01K 29/00
[52] U.S. Cl. .................................................... 119/161
[58] Field of Search ............... 119/161, 168, 166, 165, 119/162, 61; 4/449, 455, 476

[56] References Cited

U.S. PATENT DOCUMENTS

| | | | |
|---|---|---|---|
| 3,358,647 | 12/1967 | Wilson | 119/1 |
| 3,626,899 | 12/1971 | Spellman | 119/1 |
| 3,752,121 | 8/1973 | Brazzell | 119/1 |
| 3,827,401 | 8/1974 | Kranzl | 119/1 |
| 4,319,545 | 3/1982 | Sou | 119/17 |
| 4,649,578 | 3/1987 | Vargo | 119/166 X |
| 4,649,862 | 3/1987 | Neary | 119/168 |
| 4,696,257 | 9/1987 | Neary et al. | 119/166 |
| 4,979,469 | 12/1990 | Clark | 119/161 |
| 5,092,270 | 3/1992 | Simons et al. | 119/19 |
| 5,148,771 | 9/1992 | Schuett et al. | 119/17 |
| 5,184,574 | 2/1993 | Kirk et al. | 119/162 |

FOREIGN PATENT DOCUMENTS 1198638 12/1985 Canada .......................... 119/165
259293 3/1988 European Pat. Off. ............ 119/166

Primary Examiner—Thomas Price
Attorney, Agent, or Firm—Skjerven, Morrill, MacPherson, Franklin, & Friel

[57] ABSTRACT

A canine trainer and toilet station has an impervious flat one piece housing bounded by an integral peripheral upstanding side wall having a peripheral integral horizontal ridge for supporting a perforated platform on which newspaper or other absorbent sheets are placed. Fecal matter is caught on the absorbent sheets and excess urine drains through the sheets and perforations into an inclined integral housing bottom to a central drain aperture. The sidewall has a side opening into which a removable drawer may be inserted to a position under the drain aperture. The horizontal ridge includes pairs of integral wells having flexible top entry lips into which support rods extending across opposite sides of the peripheral horizontal ridge are forced in a removable interference fit. The rods support the perforated platform which can then support the weight of a urinating or defecating dog.

18 Claims, 3 Drawing Sheets

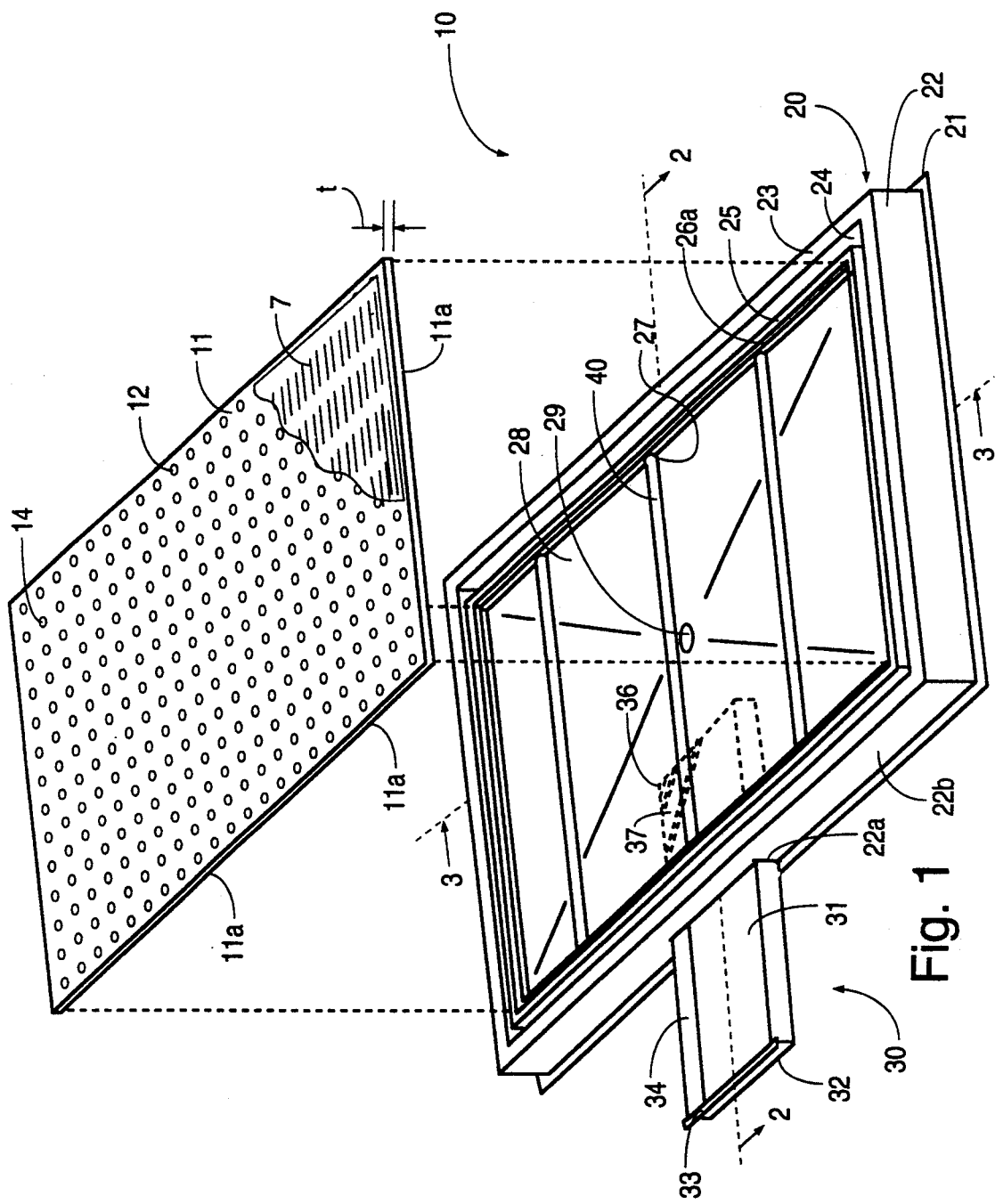

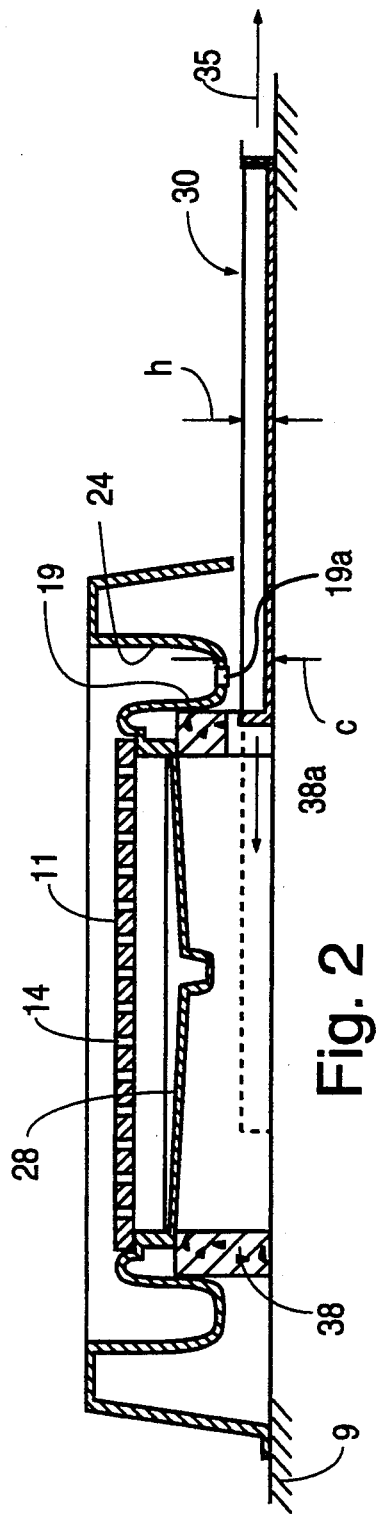
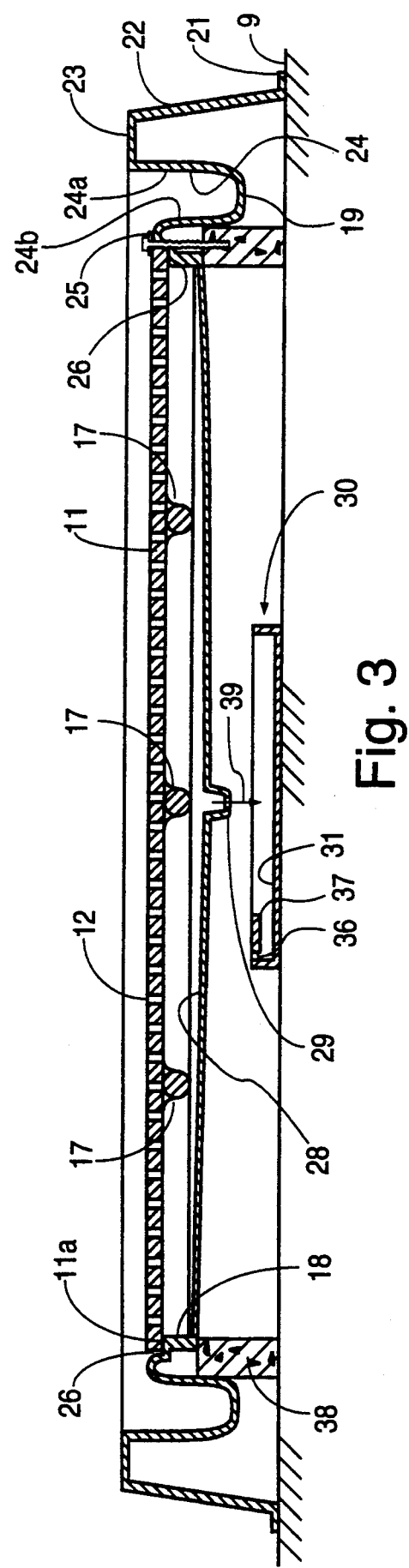

CANINE TRAINER AND TOILET STATION

BACKGROUND OF THE INVENTION

1. Field of the Invention

This invention is directed to a puppy or dog trainer or toilet for initiating and continuing routine urination and defecation of a canine species, particularly in a home environment. More specifically, the invention includes a dog-acceptable receptacle for supporting a dog's weight which employs the time-tested newsprint paper method coupled with effective urine collection and clean-up.

2. Material Art

Pet pans such as that seen in U.S. Pat. 3,358,647 have been suggested for training a puppy or full-grown dog to exercise its bodily functions in a given location by providing a flat water-proof bag draped over the margins of a tubular frame to form a dish-like liquid-proof container, the central part of the loose bag being supported by a supporting surface such as a room floor. A disposable absorbent material such as cut-up newspaper known as Kitty Litter TM or sheets of newspaper are positioned on the bag bottom. Due to the thickness of the absorbent layer, the absorbent layer stays wet and is difficult to remove due to its high liquid content. Training pads per se have been suggested as seen in U.S. Pat. No 3,626,899 in which absorbent sheet material is lined with fluid-impervious material and impregnated with an odor imparting substance to attract young dogs to the pads for the purpose of urination and defecation while discouraging the desire to chew and destroy the pad. The pads may be laid directly on a floor or placed in a cage while transporting the animal. U.S. Pat. No. 3,752,121 shows an artificial grass impregnated pad adhered to a perforated plastic sheet and an impervious plastic sheet, the pad being positioned in a reinforced bottom-grooved vacuum-formed plastic tray for support and collection of fluids. U.S. Pat. No. 3,827,401 describes an animal toilet including a reusable porous mat with porous paper thereon positioned on a porous supporting platform extending over a drain basin. A drain cock for removal of urine is provided in the basin.

Sectional pet cages as seen in U.S. Pat. No. 4,319,545; 5,092,270 and 5,148,771 have also incorporated a perforated floor and a urine-collecting bottom; a removable cat litter box drawer; and a water flushing system, respectively.

As can be seen in the patents discussed above there has been no trainer proposed that allows for easy removal of an upper layer of newspaper sheets, which permits quick drying of the newspaper sheets which have absorbed urine, which allows for easy wrapping of relatively dry sheets around fecal material for disposal and which provides for removal of drained urine without lifting and tilting of the overall catch basin.

SUMMARY OF THE INVENTION

The canine trainer and toilet station of the present invention provides a system for overcoming each of the above deficiencies of the material art recited. A one-piece vacuum-formed housing is provided with integral recessed grooves or wells for receiving Stiff plastic rods which extend across the housing to support a perforated platform. The platform may either in the form of a stiff wire-mesh perforated preform or preferably a substantially rigid perforated acrylic or other plastic board of about 0.64 cm in thickness. A number of newspaper sheets, normally about one to three sheets thick, are spread over the perforated platform in abutting relationship dependent on the plan dimensions of the platform. The rod supports are sufficiently rigid to prevent the platform from sagging under the weight of the dog which can reach about 200 pounds (91 kg.). The perforations extend in rows widthwise and lengthwise over the entire platform in order to hasten the drying of urine-wetted newspaper and the resultant quick and easy removal of any animal feces deposited on the paper by folding up the dry or semi-dry sheets. The bottom of the housing is inclined so that all urine passing through the newspaper and dripping through the apertures into the housing as the paper becomes urine-saturated is directed into a central collection aperture. One of the sides of the housing contains a side opening into which a floor-supported drawer is inserted into a position directly below the central collection aperture. Periodically the drawer is removed from the side opening and lifted to a convenient human water closet or other drain to allow pouring of the collected urine from the drawer and easy rinsing of the drawer interior. The drawer is loosely-fitted into the side opening allowing ventilation of the housing interior and the underside of the platform and newspaper sheet thereon and to hasten drying. This allows the dog care person to relatively quickly wrap up the newspaper for disposal with the paper having sufficient dryness to prevent wet tearing of the package holding the fecal matter.

BRIEF DESCRIPTION OF THE DRAWINGS

FIG. 1 is a perspective exploded view of the canine trainer and toilet station showing the drawer in a drawer "partially out" position.

FIG. 2 is a cross-sectional view thereof taken on the line 2—2 of FIG. 1 showing the drawer in dash lines in the drawer "in" position.

FIG. 3 is cross-sectional view thereof taken on the line 3—3 of FIG. 1 showing the support rods in position with the integral support wells and the drawer in the "in" position.

DETAILED DESCRIPTION

Figure 4:
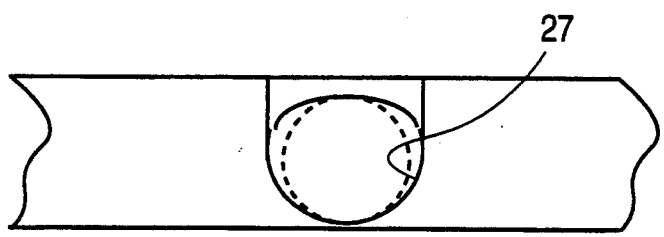
FIG. 4 is a side view of a rod support well.

The dog trainer and toilet station 10 as shown in FIG. 1 includes four principal parts: a vacuum-formed plastic housing 20, a perforated platform 11, a support or series of supports 40 supporting the platform and a loose non-rail guided drawer 30. The housing 20 is an impervious generally flat one-piece housing bounded by an integral peripheral upstanding sidewall 22 extending in a rectangular plan configuration. The sidewall 22 is inwardly inclined and has an integral flat bottom edge 21 for resting and supporting the housing on a floor or ground surface 9 (FIG. 2). An integral top bent edge 23 extends from sidewall 22 and functions as a housing stiffener with a U-bend portion or channel 24. The U-bend has a bight portion 19, the underside of which extends above the floor 9 and the housing bottom edge 21. The top bent edge 23 is integral with the outer upstanding leg 24a of the U-bend 24. The inner upstanding leg 24b of the U-bend 24 includes an integral top curved end 25 forming with a generally horizontal ridge 26 a peripheral recess 26a dimensioned to loosely receive an edge periphery 11a, normally about 0.5 cm wide, on the underside of platform 11. The height of the recess 26a is preferably just less than the thickness t of the platform so that the platform edge can be edge-grasped to remove the platform for water-spray or other washing. An integral vertical wall 18 integral with an inclined housing bottom 28 forms a fluid catch basin which inclines downwardly toward a central open collection drain aperture 29. The bottom of bight portion 19 includes an elongated drain slot 19a which has a length less than the width of drawer 3a (FIG. 2) to allow for drainage of any urine or flush water ingressing the channel 24. The channel 24 may be inclined slightly so that all liquid ingressing the channel flows by gravity to drain aperture 19a A series of support rods 40 are positioned in pairs of opposed support grooves or wells 27 depending from the horizontal ridge 26. The wells are displaced from adjacent rows of apertures so that urine does not drip on the support rods. The wells have integral top spaced flexible lips 17 which permit cylindrical rods 40 to be pressed in an interference fit into the wells by slight expansion of the lip spacing i.e. a snap-action entry. When the rod(s) is seated in the opposed pairs of wells, the top of the rod is at the same level as the horizontal ridge 26 so that the platform when inserted into recess 26a rests not only on ridge 26 but also on the tops of the rods traversing across the housing as seen in FIGS. 1 and 3.

The housing 20, preferably on a major axis edge 22b and including a juxtaposed part of bottom edge 21 has a rectangular arched opening 22a into which drawer 30 is loosely-fitted and slid to a position under drain aperture 29. The drawer is of one-piece construction of sufficient stiffness to prevent bending and includes a front panel 32, a pull handle lip 33 or other draw pull, side walls 34 and a bottom 31, forming an impervious urine collection container. The housing and drawer are made of high impact polystyrene or other plastic material having a wall thickness of about 0.3 cm for the housing and about 0.5 cm for the drawer. The housing and drawer can be made in a wide range of different sizes and colors to fit both the dog and other decor.

As seen in FIGS. 1 and 3, the drawer may have a pouring lip or spout 36 on an inner corner bounded by an angular top support cross-piece 37 spacedly extending from the sides of the drawer forming the inner corner to facilitate pouring of collected urine into a human toilet or other proper disposal site. The drawer underside as seen in FIG. 3 rests on the floor 9 and the drawer sides 34 have a height h less than the clearance c between the underside of the U-bend bight 14 and the floor 9.

In order to better support heavier dogs and inadvertent damage by a heavy child or adult stepping on the preferably vacuum-formed drain basin 20, a rectangular frame 38 of wood or structural plastic may be inserted under the wall 18, abutting against inner leg 24b and extending to floor level 9. To prevent shifting of platform 11, a series of holding screws 39 (FIG. 3) with a washer overlying the platform edge may extend through the junction of end 25 and ridge 26 and be threaded into the frame top. The frame will also have a rectangular cut-out 38a to allow entry of the drawer 30 through the frame.

The platform perforations seen in the FIGS. 1-3 embodiment are normally of about 1 cm in diameter and are placed on about 5 cm centers in x and y axis spaced rows and columns 12 and 14. This sizing and spacing affords support of dogs having a weight up to about 200 pounds (90 kg.) while still providing a relatively large total open space permitting relatively fast drying of newspaper or other urine-absorbent sheets 7 placed on the top of the entire perforated platform. In FIG. 1 only a corner is shown covered with newspapers. Upon saturation of the paper, excess urine drips from the paper through the perforations 12, 14 to the inclined surface 28, to the drain aperture 29 and as seen by arrow 39 into drawer 30.

Figure 5:
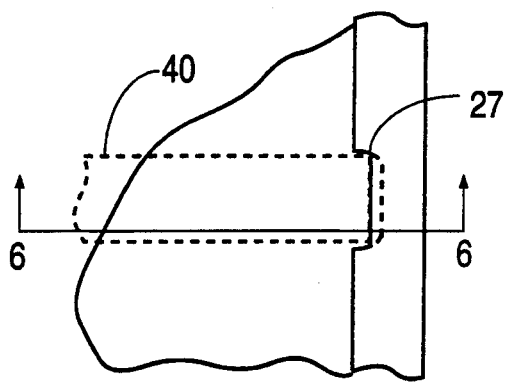
FIG. 5 is a top view thereof.
Figure 6:
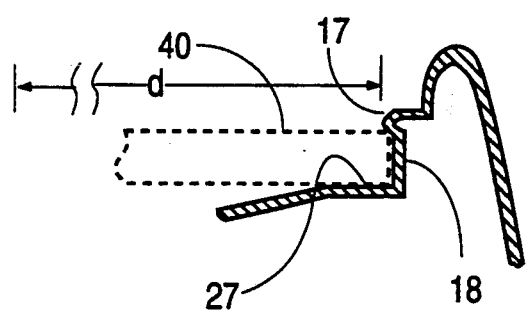
FIG. 6 is a cross-sectional view thereof taken on the line 6—6 of FIG. 5.

FIGS. 4, 5 and 6 illustrate the details of the integral grooves or wells 27 depending from ridge 26. The distance "d" between lips 17 in their home position is slightly greater than the length of a rod 40 so that the rod ends can be pressed against the top entry portion of the flexible lips to expand them outwardly and to "snap-in" the rods by a downward push of the rod into the wells 27. While three pairs of wells are shown in FIGS. 1 and 3, a greater or less number of pairs may be employed dependent on the flexibility and size of the platform and the weight of the dog using the station. The rods are typically made of solid fiberglass material.

Figure 7:
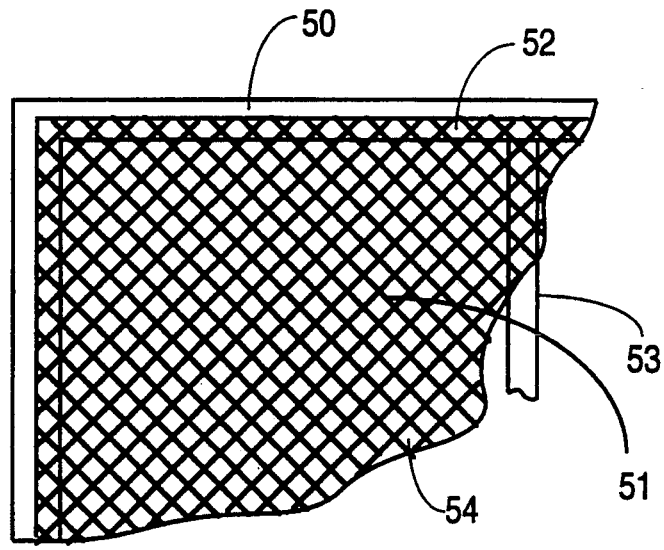
FIG. 7 is a top view of a corner of the trainer and station showing a second embodiment of the perforated platform.

FIG. 7 illustrates a second embodiment of the invention where a wood or plastic frame 50 is provided with a wire-mesh perforated platform 51 seating on an inner peripheral horizontal ledge 52 and supported by a crosspiece support rods or braces 53 under the platform and extending from one side ledge to an opposite side ledge. In this embodiment, a catch basin, drain aperture and drawer, and a frame side opening therefor, are included as in the FIG. 1 embodiment.

Optionally, a rectangular plastic backboard of suitable height such as about 60 cm may be inserted in channel 24, leaving an opening for dog ingress, to deflect any urine from the dog which is directed to otherwise exit over the edges of 22b of the housing 20. If desired, a disc or other shaped solid toilet deodorizer may be placed out of sight on the surface 28 under the platform or in the drawer 30.

The above description of embodiments of this invention is intended to be illustrative and not limiting. Other embodiments of this invention will be obvious to those skilled in the art in view of the above disclosure.

I claim:

1. A canine trainer and toilet station comprising:
    an impervious generally flat one-piece housing bounded by an integral peripheral upstanding sidewall and having an integral generally horizontal ridge extending peripherally within the sidewall, an inclined bottom surface and a drain aperture in said bottom surface;
    an integral depending U-bend extending between a top of the sidewall and the horizontal ridge, the bottom of the U-bend being spaced above a bottom of the sidewall;
    at least one support rod extending transversely across opposite spaced portions of said ridge;
    a canine-supporting perforated platform having peripheral edges seating on said horizontal ridge and overlying said at least one support rod;
    said housing sidewall including a side opening extending laterally of the sidewall and having a height less than the height of the underside of the bottom of the U-bend adjacent to the side opening; and a removable drawer dimensioned to be inserted into said side opening and positionable under said drain aperture for receiving canine urine deposited on said perforated platform.

2. The trainer and station of claim 1 wherein said housing sidewall includes a flat bottom edge for resting and supporting the housing on a floor surface, an inwardly-inclined upstanding side edge and a top bent edge integral with an outer upstanding leg of said U-bend.

3. The trainer and station of claim 2 wherein an inner upstanding leg of said U-bend includes a top curved end having an inner periphery dimensioned to removably receive an edge periphery of said platform, and wherein a lower edge portion of said top curved end integrally connects to said horizontal ridge.

4. The trainer and station of claim 2 wherein said drawer has an impervious inner bottom surface resting on a floor surface under the housing in a drawer-inserted position.

5. The trainer and station of claim 2 wherein said drain aperture is positioned centrally of said inclined bottom surface.

6. The trainer and station of claim 2 wherein said flat bottom edge, said side edge, said top bent edge, said horizontal ridge and said perforated platform are all rectangular in plan configuration.

7. The trainer and station of claim 2 wherein said horizontal ridge includes at least one pair of depending integral wells for reception of corresponding ends of said at least one support rod.

8. The trainer and station of claim 7 further comprising a series of spaced pairs of integral wells and a series of support rods in said wells extending under said perforated platform and in contact with a transverse portion of an underside of said perforated platform.

9. The trainer and station of claim 8 in which said wells include the flexible side entry lips for interference entry fit of said support rods.

10. The trainer and station of claim 1 wherein a bed of layers of newsprint paper is positioned on said perforated platform to absorb urine and hold fecal material and wherein, upon saturation of said paper, excess urine drips through the perforations in the perforated platform to said inclined surface, to said drain aperture and into said drawer.

11. The trainer and station of claim 1 wherein an inner upstanding leg of said U-bend includes a top curved end having an inner periphery dimensioned to removably receive an edge periphery of said perforated platform, and wherein said top curved end integrally connects to said horizontal ridge.

12. The trainer and station of claim 1 wherein said horizontal ridge includes at least one pair of depending integral wells for reception of corresponding ends of said at least one support rod.

13. The trainer and station of claim 12 further comprising a series of spaced pairs of depending integral wells and a series of support rods in said wells extending under said platform and in contact with a transverse portion of an underside of said perforated platform.

14. The trainer and station of claim 13 in which said wells include the flexible side entry lips for interference of said support rods.

15. The trainer and station of claim 1 wherein said flat bottom edge, said side edge, said top bent edge, said horizontal ridge and said perforated platform are all rectangular in plan configuration.

16. The trainer and station of claim 15 wherein said perforated platform is perforated with rows of circular apertures extending in rows parallel to the X and Y axes of said perforated platform.

17. The canine trainer and toilet station comprising:
a generally flat housing bounded by a peripheral upstanding sidewall and having a generally horizontal ridge extending peripherally within the sidewall;
a fluid impervious catch basin extending from said sidewall and having an inclined bottom surface directing fluid into a drain aperture;
a perforated platform seatable on said ridge;
means for supporting said platform, said means extending across opposed sides of said sidewall;
said housing sidewall having a laterally-extending side opening;
a removable drawer dimensioned to be inserted into said side opening and positionable under said drain aperture for receiving canine urine deposited on said perforated platform; and
in which said drawer includes a spout on a drawer corner, said spout being formed by a spaced angle cross support extending from the sides of said drawer forming the corner.

18. The canine trainer and toilet station comprising:
a generally flat housing bounded by a peripheral upstanding sidewall and having a generally horizontal ridge extending peripherally within the sidewall;
a fluid impervious catch basin extending from said sidewall and having an inclined bottom surface directing fluid into a drain aperture;
a perforated platform seatable on said ridge;
means for supporting said platform, said means extending across opposed sides of said sidewall;
said housing sidewall having a laterally-extending side opening;
a removable drawer dimensioned to be inserted into said side opening and positionable under said drain aperture for receiving canine urine deposited on said perforated platform; and
wherein said housing includes a drain channel surrounding said platform and extending between said sidewall and said horizontal ridge, said drain channel including a drain slot positioned above said drawer when the drawer is in an inserted position in the housing.

* * * * *